United States Patent
Galperin et al.

(10) Patent No.: US 7,317,377 B2
(45) Date of Patent: Jan. 8, 2008

(54) MULTIPLE BROADCASTING TAG AND MONITORING SYSTEMS INCLUDING THE SAME

(75) Inventors: Natan Galperin, Zoran (IL); Lev Rusman, Lod (IL); Yoav Reisman, Ra'anana (IL); Guy Greitser, Haifa (IL); Gil Gemer, Nirit (IL)

(73) Assignee: DMATEK, Ltd., Tel Aviv (IL)

( * ) Notice: Subject to any disclaimer, the term of this patent is extended or adjusted under 35 U.S.C. 154(b) by 500 days.

(21) Appl. No.: 10/490,771

(22) PCT Filed: Sep. 25, 2001

(86) PCT No.: PCT/IL01/00907

§ 371 (c)(1),
(2), (4) Date: Jul. 7, 2004

(87) PCT Pub. No.: WO03/027947

PCT Pub. Date: Apr. 3, 2003

(65) Prior Publication Data

US 2004/0252015 A1    Dec. 16, 2004

(51) Int. Cl.
*G06K 19/00* (2006.01)
(52) U.S. Cl. .................. 340/5.64; 340/539.22
(58) Field of Classification Search ........... 340/5.61, 340/5.64, 10.33, 10.1, 539.2, 11, 539.13, 340/574, 573.1, 4, 825.72, 825.69, 825.49, 340/539.22
See application file for complete search history.

(56) References Cited

U.S. PATENT DOCUMENTS

| | | | |
|---|---|---|---|
| 3,406,342 A | 10/1968 | Hubner | |
| 3,478,344 A | 11/1969 | Shwitzgebel et al. | |
| 3,518,674 A | 6/1970 | Moorehead et al. | |
| 3,739,329 A | 6/1973 | Lester | |
| 4,095,214 A | 6/1978 | Minsly | |
| 4,225,953 A | 9/1980 | Simon et al. | |
| 4,593,273 A | 6/1986 | Narcisse | |
| 4,924,211 A | 5/1990 | Davies | |
| 5,218,344 A | 6/1993 | Ricketts | |
| 5,317,309 A * | 5/1994 | Vercellotti et al. | ......... 340/10.5 |
| 5,426,425 A | 6/1995 | Conard et al. | |
| 5,504,474 A | 4/1996 | Libman et al. | |
| 5,565,858 A * | 10/1996 | Guthrie | .................. 340/10.33 |
| 5,596,313 A | 1/1997 | Berglund et al. | |
| 5,602,535 A * | 2/1997 | Boyles et al. | ............... 340/5.22 |
| 5,621,388 A | 4/1997 | Sherburne et al. | |

(Continued)

FOREIGN PATENT DOCUMENTS

EP          0 733 988          9/1996

(Continued)

*Primary Examiner*—Edwin C. Holloway, III
(74) *Attorney, Agent, or Firm*—Venable, LLP; Catherine M. Voorhees (57) ABSTRACT

An improved transmitting tag for enhancing the tracking and locating capability of a monitoring system and for allowing control over accessibility to particular zones and/or equipment within a restricted area. The tag is provided with a transmitter of multiple broadcasting signals for allowing periodical broadcasting of at least two signals of different strength at different time intervals and preferably of different information content. The signals carry the tag identification code and a strength identification code. The weak signals emitted by the tag can be further exploited for allowing or denying accessibility to local operating systems.

25 Claims, 4 Drawing Sheets

U.S. PATENT DOCUMENTS

| | | |
|---|---|---|
| 5,682,142 A | 10/1997 | Loosmore et al. |
| 5,793,290 A | 8/1998 | Eagleson |
| 5,831,535 A | 11/1998 | Reisman et al. |
| 5,936,529 A | 8/1999 | Reisman et al. |
| 6,040,774 A | 3/2000 | Schepps |
| 6,097,292 A | 8/2000 | Kelly et al. |
| 6,181,253 B1 | 1/2001 | Eschenbach et al. |
| 6,208,694 B1 | 3/2001 | Addy |
| 6,211,781 B1 | 4/2001 | McDonald |
| 6,222,440 B1 | 4/2001 | Heller |

FOREIGN PATENT DOCUMENTS

| | | |
|---|---|---|
| WO | WO8906367 | 7/1989 |

\* cited by examiner

MULTIPLE BROADCASTING TAG AND MONITORING SYSTEMS INCLUDING THE SAME

BACKGROUND OF THE INVENTION

1. Field of the Invention

The present invention generally relates to electronic monitoring systems. More specifically the present invention relates to an improved transmitting tag for enhancing the tracking and locating capability of a monitoring system and for allowing control over accessibility to particular zones and/or equipment within a restricted area. The present invention further relates to monitoring systems including the tag.

2. Discussion of the Related Art

Electronic monitoring systems for remote monitoring and supervising of moving objects, and in particular for monitoring persons, are known in the art. Such systems are employed for a wide range of applications in a variety of fields, including security, law enforcement, medical and more. A typical monitoring system comprises a plurality of portable transmitting devices, known as "tags", one or more fixed or mobile local monitoring unit and a central monitoring station where the information received by the local monitoring units is collected and further processed. Each tag is having an identification code. The identification code may be a unique code specific to the subject with whom the tag is associated, such that the subject can be identified unequivocally. Alternatively, the identification code may be a code typical to a certain group. For example, in a hospital stuff may carry a tag of one identification code while patients carry tags of a second code. The local monitoring unit includes a receiving unit tuned to the frequency of the signals transmitted by the transmitting tags. Typically the local monitoring unit further includes a microprocessor to allow local processing of the data before sending it to the central monitoring station. The communication between local monitoring units and a central monitoring unit may be either wireless communication, e.g. RF, or by conventional communication lines such as telephone lines, cable TV, WAN, LAN, etc.

When used for monitoring persons, the portable tag is usually strapped around a limb of the person being monitored and typically includes various sensors for sensing tampering with the tag and other activities of the monitored person. The sensors are tested periodically and corresponding signals, including the tag identification code and the sensors data, are broadcast periodically to be received by one or more local monitoring units, whereby they are processed and optionally reported to the central monitoring station. Current tags typically include microprocessors which enable programming the operation of the tag with regard to various parameters in order to meet the requirements specific to the subject to whom the tag is attached. Thus, parameters such as sampling intervals, data transmission intervals, monitored time periods, permitted and barred locations, etc., can be selected according to specific the needs.

U.S. Pat. Nos. 5,504,474, 5,831,535 and 5,936,529, all assigned to the present assignee and incorporated herein by reference, including drawings and references cited therein, disclose a tamper-resistant tag of the type described above, for use with monitoring systems. U.S. Pat. No. 5,936,529 further teaches a manual resetting device which, when connected to the tag, enables external reprogramming of the tag by authorized parties. Thus, program parameters can be easily reset for reuse with another subject.

Generally, monitoring systems are operated under two basic configurations. One configuration, consists of separate independent local monitoring systems, each comprising a local monitoring unit dedicated to one or more tag carriers which are confined to a pre-determined location. The confined area can vary in size and accordingly the strength of the signal emitted from the tag and/or the reception level of the local receiver are chosen to fit the specific area. The local monitoring units may report to a central monitoring station where information from separate stations is collected and compared to the specific program requirements put on the specific monitored person. Alternatively, a local monitoring unit can be an independent station where data is processed for further action. Monitoring systems of this type are used for example for criminal offenders under house arrest, where the offender is required to stay in a pre-designated location or for Alzheimer patients where there is a danger of the patient getting lost, etc. Typically the pre-designated location is the monitored person residence.

Another configuration is an area monitoring system (AMS) where a network of receivers "covers" a restricted area in which a plurality of tag carriers are moving. Such systems are employed in building facilities and surrounding, for example hospitals, rehabilitation centers etc., where a large number of persons are monitored within the same area. The local receivers in an area monitoring system are arranged such that the receiving range of each receiver covers a certain part of the whole area. Preferably the zones covered by adjacent receivers overlap such that the signals transmitted by tags are received by more than one receiver. The data collected from all receivers is reported to a central monitoring station where, by applying various methods, the location of each of the tag carriers is determined to more or less degree of accuracy. Such methods may employ triangulation calculations based on signal strength analysis, time-of-arrival analysis, angle-of-arrival analysis or combinations thereof. Simpler "cell based" methods may use a set of rules based on knowledge of the coverage area of each of the receivers and of overlapping regions. However, known methods suffer from a number of drawbacks. Triangulation methods may involve special relatively expensive technology such as direction-finding receivers and may also suffer from inaccuracy due to screening and reflecting effects, especially when used indoors. The simpler "cell based" methods are inherently limited by the number of the local units distributed within the monitored area and their coverage area. The tracking and locating ability of monitoring system, i.e., the ability to continuously locate the position of individuals as they move throughout a restricted zone, depends on the space and time resolution of the information received. Obviously, the higher the number of receivers distributed within a confined area and the shorter the time intervals between successive signals, the better is the tracking resolution. However, expense consideration put constraints on the number of receivers and power consumption consideration limit the signal transmission repetition rate. There is therefore still a need for improving tracking capability of monitoring systems.

The present invention, by adding a novel feature within the existing basic structure of a transmitting tag, provides enhancement of tracking resolution of monitoring system in both time and space, without increasing significantly power consumption. Furthermore, the novel feature of the present invention provides other benefits such as, for example, control over accessibility to particular zones and/or equipment within a restricted area. Thus, the transmitting tag of the present invention not only offers the advantage of enhanced tracking but can also be used for enhancing control over the movements and actions of the monitored subject.

SUMMARY OF THE PRESENT INVENTION

It is the general object of the present invention to provide a transmitting tag with enhanced transmission capabilities for improving the locating accuracy of a monitoring system by increasing both tracking space resolution and time resolution.

It is still another object of the present invention to provide such a tag for providing monitoring system with enhanced location accuracy while conserving battery power.

A further object of the present invention is to provide a transmitting tag for use with monitoring systems which can also be used in conjugation with an operating system coupled to a local receiver, and in particular, for allowing or denying access to particular zones by controlling door lock mechanism.

Yet, a further object of the present invention is to provide electronic monitoring system having enhanced tracking resolution and enhanced control over subject accessibility to particular zones within a confined area.

The above and other objects are met by providing a transmitting tag with enhanced transmission capabilities.

One aspect of the present invention is a transmitting tag, having an identification code, programmed to periodically broadcast two or more signals of variable strength at variable time intervals and optionally, of variable data content. In accordance with a preferred embodiment, the transmitting tag periodically transmits "strong" signals at a first substantially predetermined time intervals and low energy consuming "weak" signals, at a second substantially predetermined time interval, second predetermined intervals are shorter than first predetermined intervals.

A second aspect of the present invention is a monitoring system comprising at least one tag periodically transmitting at least two signals of different strength and at least one local receiving unit tuned for receiving said signals.

Yet, another aspect of the invention is a monitoring system comprising at least one tag transmitting signals of multiple strength, at least one local receiving unit tuned for receiving said signals, and at least one control unit communicating with said at least one local receiving unit for controlling a local operating system. The control unit controls the operating system in accordance with the tag identification code carried by at least one of said signals of multiple strength, preferably in accordance with a short-range weak signal. The operating system may be for example an automatic door lock located at the entrance to a forbidden area, an alarm system, an automatic phone dial to a predetermined phone number, etc.

Additional objectives, features and advantages of the invention will become apparent from the following detailed description.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

The present invention relates to a transmitting tag with enhanced broadcasting features for enhancing tracking capability of electronic monitoring systems. The invention provides within the existing basic structure of a transmitting tag.

A typical transmitting tag in which the novel features of the present invention can be implemented, is disclosed in U.S. Pat. Nos. 5,504,474, 5,831,535 and 5,936,529 incorporated herein by reference. Such a tag includes a housing enclosing an electronic circuitry, an attaching means for attaching the housing to the monitored person, typically by encircling the tag around a person limb, and a sensing means for sensing tampering with the tag or other activities or events of or connected with the subject being monitored. The electronic circuitry, enclosed within the housing, includes a data processor for receiving and processing data and a RF transmitter for broadcasting data to a remote location. The sensing means may include a tamper sensor for sensing any tampering with the tag or its removal from the person to whom it is attached, a body sensor for detecting whether the tag is placed against flesh, a motion sensor, temperature sensor, location sensor, pulse sensor, etc. Likewise the tag sensing means may include means for detecting any predetermined event. The tamper sensor may be of the open-closure type disclosed in the above-cited U.S. Pat. No. 5,504,474 in which any attempt to cut or open the tag results in a break in the continuity of an electrical circuit. The body sensor can be a short-range transmitter-receiver couple as disclosed in U.S. Pat. No. 5,504,474 detecting changes in the strength and frequency of the transmission. The tag may also include other sensors for providing information about the medical condition of the monitored person, such as temperature sensor, pulse sensor, etc.

It will be appreciated by persons skilled in the art that the present invention is not limited to the tag described in U.S. Pat. No. 5,504,474. Rather, the invention as described below, can be easily incorporated into any other tag used in monitoring system. For example, the tag of the present invention may be a simple tag which does not include any special closure means or sensing means. Such a tag can be carried by the person being monitored or attached to his garments by simple attachment means such as a clip etc.

Figure 1:
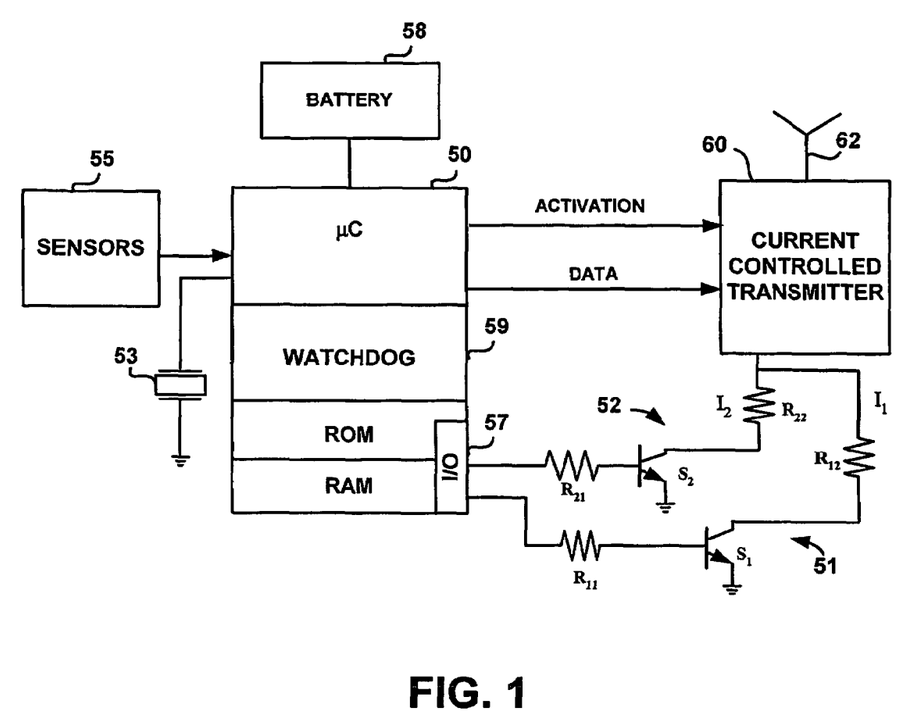
FIG. 1 is a block diagram illustrating the main components of an electronic circuitry of a transmitting tag in accordance with a preferred embodiment of the present invention.

FIG. 1 illustrates a block diagram of the electronic circuitry, enclosed within the housing of a transmitting tag in accordance with a preferred embodiment of the present invention. The electronic circuitry includes a microcontroller 50 for controlling the tag operation and a transmitter 60 for broadcasting data signals to a remote receiver via antenna 62. Microcontroller 50 includes a central processing unit and a memory (non-volatile memory ROM and volatile memory RAM) for storing the operation program and the tag identification code. A CPU clock 53, for example a 2 MHz crystal, is coupled to microcontroller 50. Any comparable processing unit having a central processing unit, a memory device capable of running a computer program, could replace Microcontroller 50. Also included is a watchdog timer 59 for use with the microcontroller 50 serving as a wake-up controller for periodically initiate a new operation cycle at predetermined time intervals. Sensing means 55 provide input data to microcontroller 50 regarding tampering and other activities of the person being monitored. Sensing means 55 may include various sensors, such as open-closure sensor, body proximity sensor, motion sensor etc., as described above. The electronic circuitry is powered by battery 58.

The novel feature of the present invention is the multiple broadcasting of at least two signals of different strength, different periodicity and preferably of different data content. Multiple broadcasting, i.e., switching between defined values of RF output power can be achieved by controlling parameters such as current and voltage, switching different transistors, etc. In the example shown here, multiple broadcasting is achieved by employing a transmitter 60 of the current-controlled type, or a power-controlled type and a two-branch switch circuit 51, 52, at the entrance to transmitter 60. By means of synchronized switching of on/off switches $S_1$ and $S_2$, the I/O unit 57 controls alternating between simultaneous shutting and opening of branches 51 and 52, such that transmitter 60 is driven either by current $I_1$ or current $I_2$. Thus, $I_1$ and $I_2$, being of different amperage, give rise to broadcasting signals of different intensities. Synchronized with switching between currents $I_1$ and $I_2$, microcontroller 50 may switch between different data to be broadcast, such that signals of different strength may also carry different data content. It will be easily appreciated by persons skilled in the art that other types of power-controlled transmitters may be used as well. It will be also appreciated by person skilled in the art that the tag may be easily programmed to broadcast more than two signals. For example the switch circuit shown in FIG. 1, may include more than two branches enabling switching between more than two currents for broadcasting more than two signals of different intensities at different intervals and possibly of different information content.

Figure 2:
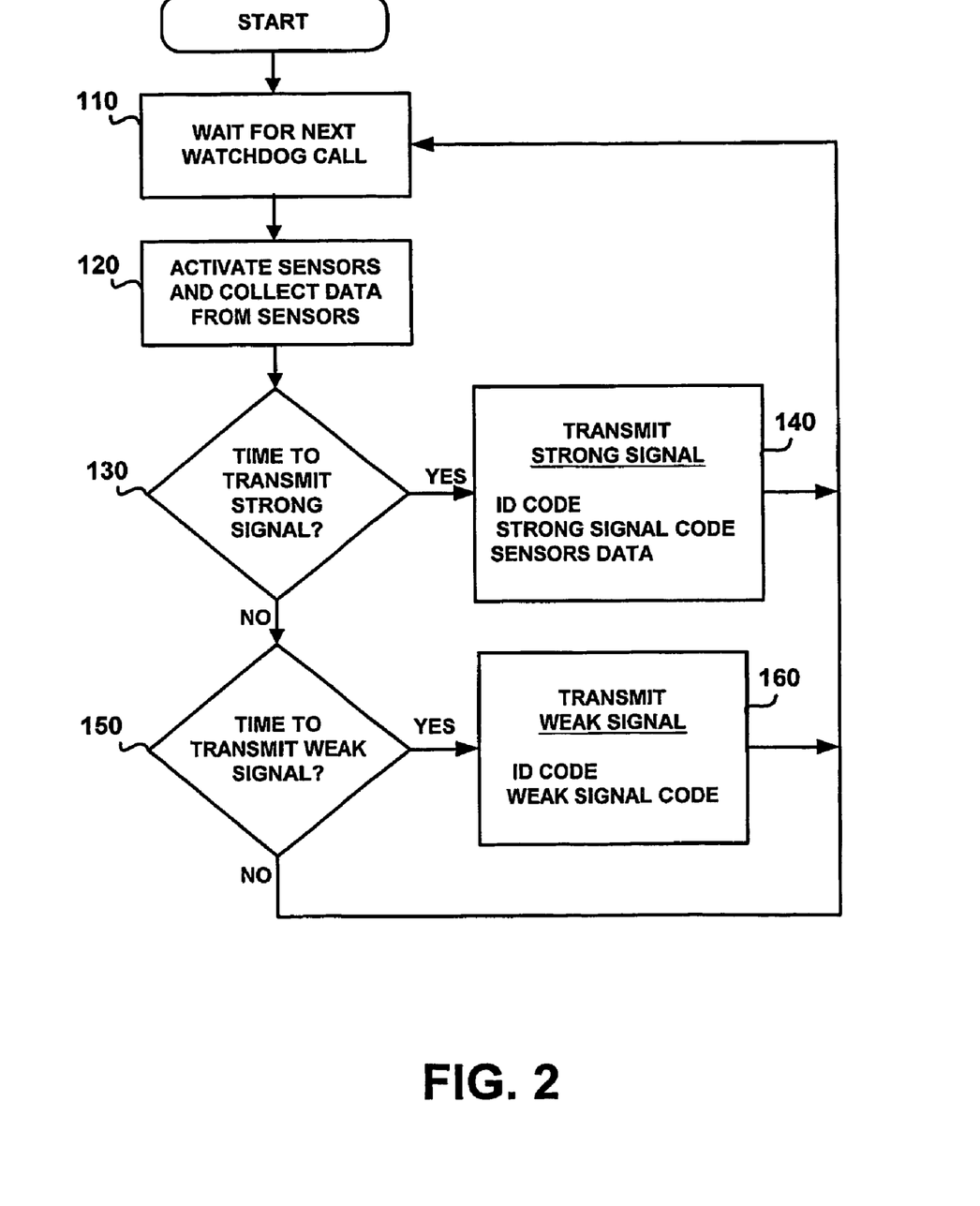
FIG. 2 is a flow chart depicting an example of the main operation steps of the transmitting tag of the present invention.

Microcontroller 50 is programmed to activate sensing means 55 to take readings at predetermined time intervals, to process said readings and to activate transmitter 60 to broadcast multiple signals at multiple time intervals. FIG. 2 is a flow chart illustrating an example of operational program of microcontroller 50 according to which two signals of different intensity, a "strong" signal and a "weak" signal are broadcast periodically. The signals carry signal identification indicating the signal intensity, i.e. "weak signal" code or a "strong signal" code, such that the signals can be interpreted according to their transmitting range. Microcontroller 50 operates is in a loop manner. The microcontroller first wait for a call from the watchdog timer. Upon such a call (step 110), the microcontroller activates the sensors to take a reading (step 120). In step 130, elapsed time since last strong signal broadcasting is checked to see whether it is time to send another strong signal. If it is, then the transmitter broadcast a strong signal which carries the tag identification code, the strong signal code and the information received from the sensors step 140. Otherwise a check is done to see if it is time for a weak signal (step 150). If it is, then the transmitter broadcasts a weak signal. In the example shown here, a weak signal carries only the tag unique identification code and a weak signal code. If it is neither time for a strong signal nor for a weak signal, the system goes back to a standby mode, waiting for the next watchdog call. It should be realized that the flow chart given here is only an example and other possibilities with regard to the number of signals of different strength and to the sequence of the steps taken can be easily employed. It should also be noted that in the example shown here, there are three independent predetermined time intervals, the time intervals between sensor reading, the time intervals between strong signals and the time intervals between weak signals. Typically sensor readings are taken at time intervals of 0.5 to 2 seconds, weak signals are broadcast at intervals of 0.5 to 5 seconds and strong signals are broadcast at intervals of 10 to 30 seconds. Other time intervals can be employed as well for taking sensor readings.

In addition to the periodical broadcasting of multiple signals at predetermined intervals, the tag may also be programmed to change the time pattern of broadcasting when specific circumstances are detected by the sensing means. In addition, the tag may also be programmed to initiate and broadcast an additional transmission upon the occurance of a predetermined event. For example, the tag can be programmed to broadcast only strong signals or alternately strong and weak signals at higher repetition rate, upon tampering. In another example, the tag may issue an alarm signal, irrespective of the weak or strong signals, in ceratin events such as when there is an attempt to remove the tag from the wearer. Tampering is the unauthorised use or abuse of the tag. Tampering can also be the a predetermined event upon which a certain action is performed by the tag. Such event can be an attempt to remove the tag, an attempt to damage or destroy the tag, an attempt to shield the tag and prevent broacast and an attempt to stop broadcast by the tag. Other events can include low battery of the tag, failure of an electronic or another component of the tag and the separation of the tag from the human body or a garment on the human body. The person skilled in the art will appreciate the many other similar events that can be employed as a predetermined condition for tampering with the tag.

Naturally, the reception range of a local receiving unit with regard to weak signals is smaller than the reception range of strong signals. Thus, reception of weak signals provides enhanced tracking resolution with regard to space. Furthermore, the weak signals can be transmitted at a much higher rate than the rate commonly used for "strong" signals without shortening significantly the battery lifetime, thus increasing the tracking time resolution as well. The advantages of the tag of the present invention can be particularly shown in the monitoring system environment described below.

Figure 3:
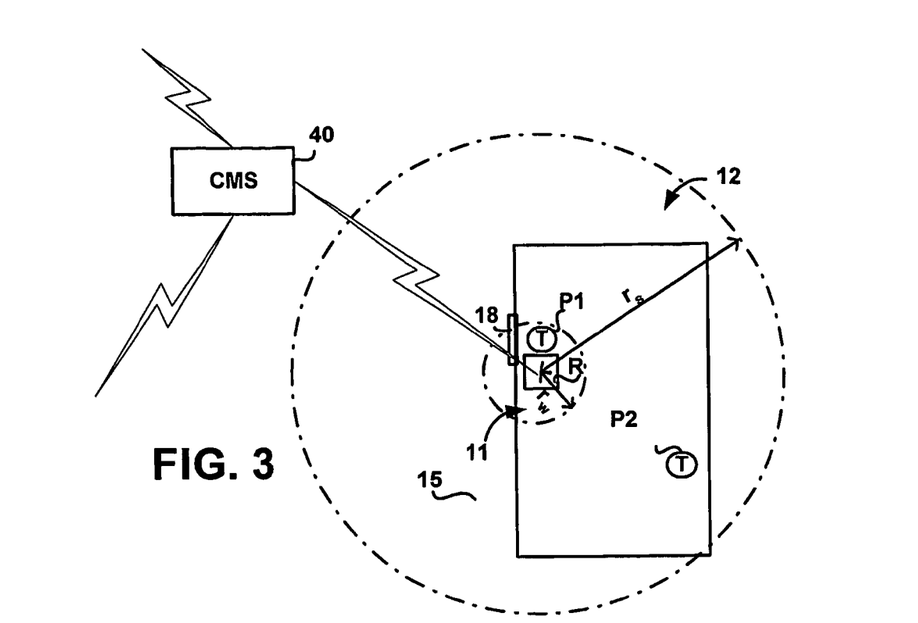
FIG. 3 is a schematic illustration of a monitoring system in accordance with the present invention.
Figure 4:
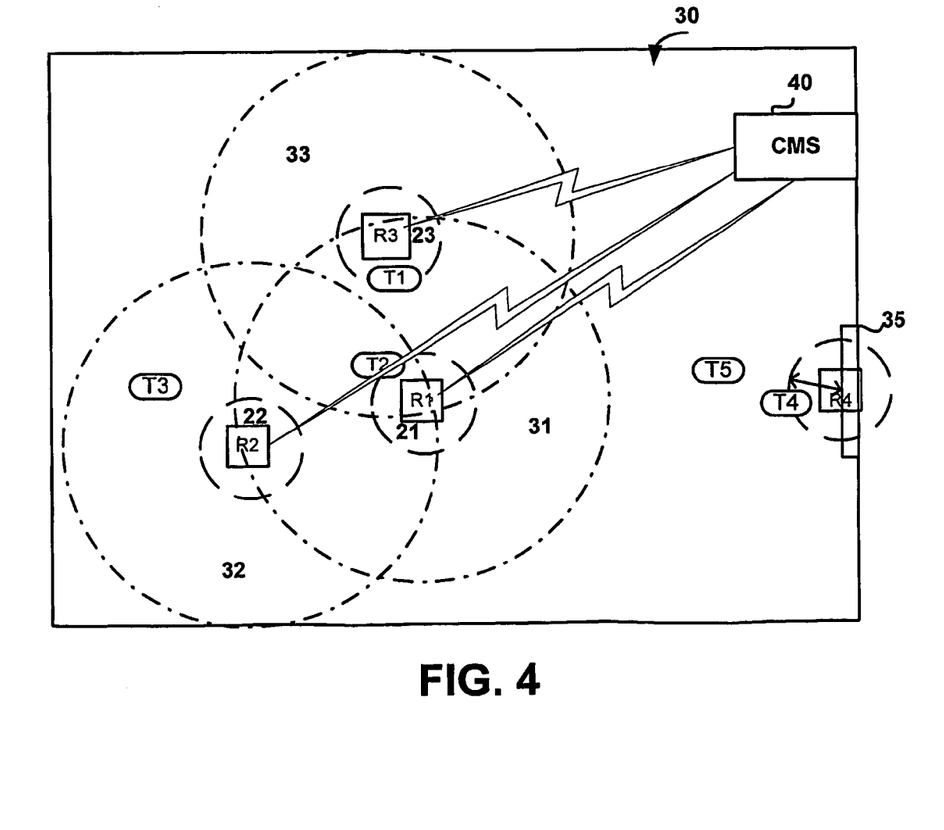
FIG. 4 is a schematic illustration of an area monitoring system in accordance with the present invention.

FIGS. 3 and 4 are schematic illustrations of monitoring systems comprising a tag of the present invention. The example shown in FIG. 3 illustrates a monitoring system such as used for monitoring a person under home detention. The system comprises a transmitting tag T, attached to a monitored person, a local receiver, R, tuned to the frequency of tag T, and a central monitoring station (CMS) designated 40. Central monitoring station 40 collects data from a plurality of local receivers (not shown). Data from local receivers can be transmitted to central monitoring station either wirelessly, e.g., cellular phone communication, or by conventional phone lines. In the example shown here, receiver R is located inside building 15, supposedly the home of the monitored person. Tag T is a dual strength tag as described in FIGS. 1 and 2, transmitting strong signals at a first predetermined time intervals and weak signals at a second predetermined time intervals, second time intervals are shorter than first time intervals. The reception ranges of receiver R, corresponding to the reception range of the weak signals and to the reception range of strong signals are illustrated as circles 11 and 12 having radius $r_w$ and $r_s$ respectively. For example, the smaller area 11, i.e., the reception range of the low signals can be predetermined to substantially overlap the immediate area around exit door 18, while the larger area 12 can be predetermined to cover the person residence, designated 15, and surrounding. Thus, strong signals indicate the presence of the tag carrier in the house while weak signals indicate his presence near the exit door. In the example shown here, when tag T is located at position P1 receiver R receives both weak signals and strong signals indicating the presence of the subject near exit door 18. When tag T is in location P2 only strong signals are received, indicating the presence of the subject in the house but not near door 18. The short time intervals between weak signals ensures that even a very short stay within range 11 will be recorded.

FIG. 4 illustrates an example of an area monitoring system where a plurality of persons each carrying a tag, designated T1, T2, T3, etc. are confined to a restricted area, designated 30. Tags T periodically transmit weak signals at short time intervals and strong signals at longer time intervals as described above. Area 30 can be a built facility comprising a plurality of rooms separated by walls (not shown), it can be an outdoor area or a combination thereof. Receivers R, only three of them, R1, R2 and R3, are shown here, are distributed throughout area 30. Each of receivers R1, R2 and R3, covers a certain range with regard to weak signals reception, designated 21, 22 and 23 respectively, and a larger range with regard to reception of strong signals, designated 31, 32 and 33. The reception ranges of strong signals partly overlap, such that, except at the area margins, almost any point within area 30 is covered by at least two receivers with regard to strong signals. Although, overlapping regions increase locating resolution, there is still need to increase resolution. The overlapping areas can be still too large, such as for example to cover more than one room inside a building. Triangulation methods may also fail to give accurate location due to screening and deflecting effects as mentioned above. It will be easily realized by persons skilled in the art that by providing the tags with a short-range transmission capability, and correspondingly providing the receivers with a smaller effective range of reception, a much higher tracking accuracy is gained. FIG. 4 illustrated a few examples demonstrating the gain in accuracy. For example tag T1 is located within the overlapping range of area 31 and 33 but also within area 23. Thus, a much more accurate location is achieved. Similarly, tag T2 is located within range 21, which is much smaller than the overlapping area between 31, 32 and 33. It should be emphasized that using a tag of dual intensity provides better space resolution at any location and not only where weak signals are received. The use of dual intensity transmitter in effect divides the reception range of the receivers into two regions, namely, the reception region of weak signals and the concentric ring formed by the difference between the reception ranges of strong and weak signals, i.e., where only strong signals are received. Thus even in areas from where only strong signals are received, space resolution is better compared to the space resolution of a single intensity transmitter of the same strength. For example, the weak signals emitted by tag T3 cannot be received by any of receivers R. This reduces the possible location of T3 by excluding regions 21 and 22 from the overlapping region between 31 and 32. Furthermore, as tag carriers are moving throughout area 30, even a few records of weak signals reception enhance tracking ability and facilitates reproducing track and location. Thus, receivers R can be located at strategic points, such as in corridors and passages, where individuals passing from one area to another must pass by.

it will be easily appreciated by persons skilled in the art that although for simplicity sake, the examples given here describe a dual intensity transmitter, transmitters with more than two transmitting intensities can be used without departing from the scope of the present invention. For example, the tag of the present invention may comprise a transmitter with three intensities: strong, medium and weak. Such a transmitter may allow the division of the area covered by the strong signals into two approximately equal areas, i.e., by using the appropriate medium intensity, while the weak signals provides points of very accurate location. Along the same lines, higher number of signals of different intensities may be used for enhancing space resolution without increasing the number of receivers, thus significantly reducing costs.

In addition to gain in location accuracy, the novel feature of the present invention imparts the tag other advantages by exploiting the weak signals to function as a short-range remote controller for allowing or denying accessibility to particular zones and/or equipment within the restricted area. For example receiving unit R4 located in the close proximity of exit 35 of confined area 30, can communicate with a control unit coupled to automatic door lock/unlock operating system. The control unit may contain a list of tag identification codes permitted or forbidden to exit and comparison means for comparing a tag identification code transmitted by a weak signal to said list in order to decide whether to allow exit. Along the same lines, such a control unit can be located at the entrance to certain zones within area 30. It should be realized that long range signals of relatively large big intervals cannot provide such a control possibility. For example, suppose tag carrier T5 is permitted to pass through exit 35 and tag carrier T4 is forbidden. If the control unit relies on the information received from long range signals, then the signals received by T5 will allow T4 to exit during the time interval between two consequent signals. Thus, only short-range signals of high repetition rate can serve for this purpose. The system described above can be incorporated in the configuration illustrated in FIG. 3, as well. For example, receiver R may communicate with an operating system which controls locking mechanism of exit door 18. Thus, the tag carrier can be prevented from exit his residence during certain hours of the day, e.g., during the night, or without an authorized companion. For example, in a case of an Alzheimer patient, the patient can carry a tag of one identification code while his attendant may carry a tag of a second identification code. The operating system can be programmed to lock door 18 upon receiving weak signals from the patient tag and to open the door when receiving weak signals from the attendant tag wherein the attendant signals override the patient signals. Such a program will allow the exit of patient only when accompanied by his attendant. Alternatively, or additionally, the receiver can be programmed to activate an alarm, to activate an automatic dial system etc., in order to notify authorized parties of attempts to leave the confined zone.

It will be appreciated by persons skilled in the art that the examples given above are only a few examples for the innumerable possibilities provided by coupling the tag of the present invention with an operating system by means of a local receiver. In particular, such operating systems are not limited to controlling accessibility to particular zones but might serve as well for controlling accessibility to particular equipment. For example, in hazardous industrial facilities, where monitoring system is used as safety precaution, the tags carried by workers can be exploited as well for allowing or denying accessibility to particular equipment distributed within the facility, in accordance with the identification code associated with each tag. In another example, inmates of an incarceration facility or offendors under home arrest or at a remote confinment facility or patients of a medical facility may be denied access to specific equipment such as a computer terminal or a medical device. In similar fashion, the system shown can be used to monitor emplyees in a secure facility where access to particular zones or machines or cabinets is restricted.

Figure 5:
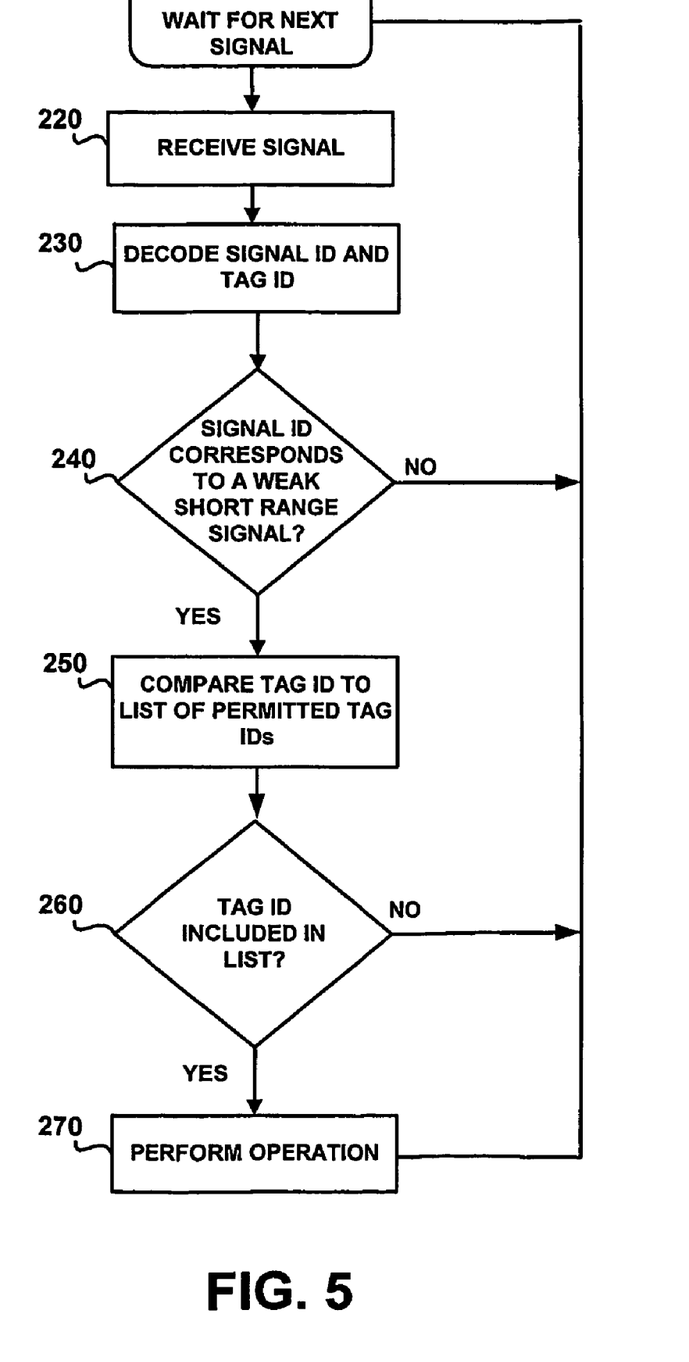
FIG. 5 is a flow chart depicting the main operation steps of a controlling receiving unit in accordance with the present invention.

FIG. 5 gives an example of the steps taken at a controlling receiving unit coupled to an operation system for allowing or denying accessibility to said operation system in accordance with the weak signals emitted by a tag of the present invention. Such operating system can be a device for locking or unlocking a door, an alarm system, communication system and the like. A communication system can include any system capable of forwarding messages to third parties in response to the controlling receiving unit instructions. Such may include for example, a computer, a PSTN telephone, a cellular phone, a pager, a two-way radio or pager, an electronic mail sender and the like. The communication system can be operated in conjunction with the alarm syste, and any locking or unlocking device or in conjunction with any other mechanical device performing operations in respect of the alarm generated as a response to the controlling receiving unit message. Such can include sending an alarm via a telephone line or a cellular call or an e-mail message to a central office overseeing persons under home arrest, or sending an alarm that an elderly person has tried to remove his tag to a supervisor's terminal or cellular phone via an SMS message issued via the communications system. At the same time, the system may lock the door of that elederly person or lock the house entrances and exists of that person under home arrest. It may also issue voice notifications to such persons via a voice system installed at the home where the person under arrest is present or at the facility or room of the elderly person.

Upon receiving a signal (step 220) the signal is processed (step 230) for decoding the tag identification code and the signal strength code, i.e., strong signal vs. low signal. If the signal received was not a weak signal, the system waits for the next signal (steps 240, 210). If the signal ID corresponds to a weak signal, the tag identification code is compared to the list of tag ID (steps 250, 260) and accordingly operation is performed (step 270) or denied. Steps 250 and 260 can take place at Central Monitoring System (40 of FIGS. 3, 4) and the like. The flow chart shown in FIG. 5, illustrates only the steps corresponding to the receiver functioning as part of the control unit. However it will be easily appreciated by persons skilled in the art that beside executing what is shown, the receiver might as well function also part of a common local monitoring unit.

It will be appreciated by persons skilled in the art that the present invention is not limited to what has been particularly shown and described hereinabove. Rather the scope of the present invention is defined only by the claims which follow.

The invention claimed is:

1. A transmitting tag for use with a monitoring system, the tag is provided with an identification code, the tag comprising:
    a housing; and
    an electronic circuitry supported within said housing, the electronic circuitry including a processing unit and a transmitter for broadcasting data carrying signals to a location remote from the tag; the processing unit includes a data processor for receiving and processing data and a memory for storing the tag identification code and a program for operating the tag;
    wherein the transmitter periodically broadcasts at least a first data carrying signal of a first predetermined strength at substantially first predetermined time intervals and at least one second data carrying signal of a predetermined second strength at substantially second predetermined time intervals and wherein at least one of said at least first and second signals carries a signal strength identification code.

2. The tag of claim 1 wherein the data carried by said at least two data carrying signals includes the tag identification code.

3. The tag of claim 1 further comprising a closure means for affixing the housing to a subject being monitored.

4. The tag of claim 1 further comprising a sensing means for collecting data regarding the activities of a subject being monitored.

5. The tag of claim 4 wherein said sensing means include at least one of the following sensors: open-closure sensor, motion sensor, body sensor, temperature sensor, location sensor and pulse sensor.

6. The tag of claim 1 wherein said second predetermined strength is higher than said first predetermined strength and said second predetermined time intervals are longer than said first predetermined time intervals.

7. The tag of claim 6 wherein said first signal carries the tag identification code and a weak signal code.

8. The tag of claim 6 wherein said second signal carries the tag identification code, a strong signal code and the data collected by sensing means associated with the tag.

9. The tag of claim 1 wherein said transmitter is an RF transmitter.

10. The tag of claim 1 wherein said transmitter is a power-controlled transmitter and said electronic circuit includes a multiple-branch switch circuit for controlling said power-controlled transmitter.

11. The transmitting tag of claim 1 wherein said monitoring system comprises at least one local receiving unit, the receiving unit includes a receiver tuned for receiving the signals emitted from said transmitting tag, and a data processor adapted for receiving and processing data.

12. The transmitting tag of claim 11 wherein said monitoring system further comprises a central monitoring station.

13. The transmitting tag of claim 11 wherein
    at least one of said at least one local receiving unit further includes a memory means for storing at least one identification code of at least one transmitting tag and comparison means for comparing said at least one identification code of at least one transmitting tag with a tag identification code received by the local receiving unit;
    said monitoring system further comprises at least one control unit, communicating with the local receiving unit, for controlling the operation of a local operating system, said control unit controls said local operating system in accordance with the results of said comparison.

14. The transmitting tag of claim 12 wherein said local operating system includes one or a combination of the following systems: an automatic door lock/unlock operating system, alarm system, a communications system.

15. An electronic monitoring system comprising at least one transmitting tag having a tag identification code attached to a monitored subject and at least one receiving unit tuned for receiving signals transmitted from said tag, the tag periodically broadcasts at least a first data carrying signal of a first predetermined strength at substantially first predetermined time intervals and at least one second data carrying signal of a predetermined second strength at substantially second predetermined time intervals wherein at least one of said at least two signals carries a signal strength identification code.

16. The electronic monitoring system of claim 15 further comprising a central monitoring system.

17. The electronic monitoring system of claim 15
said second predetermined strength is higher than said first predetermined strength and said second predetermined time intervals are longer than said first predetermined time intervals.

18. The electronic monitoring system of claim 15 wherein at least one of said at least one receiving unit further includes at least one memory device for storing at least one identification code of at least one transmitting tag and comparison means for comparing said at least one identification code of at least one transmitting tag with a tag identification code received by the receiving unit;
said monitoring system further comprises at least one control unit, communicating with the receiving unit, for controlling the operation of a local operating system, said control unit controls said local operating system in accordance with the results of said comparison.

19. A method for enhancing the tracking and locating capabilities of an electronic monitoring system, the monitoring system comprises at least one receiving unit and at least one transmitting tag having a tag identification code, the method comprises:
providing the tag with multiple strength broadcasting capability; and
programming the tag to periodically broadcasting at least a first data carrying signal of a first predetermined strength at substantially first predetermined time intervals and at least one second data carrying signal of a predetermined second strength at substantially second predetermined time intervals wherein the data carried by said first and second signals includes the tag identification tag, and wherein at least one of said at least two signals carries a signal strength identification code.

20. The method of claim 19 further comprising providing sensing means for collecting data regarding the activities of a subject being monitored.

21. The method of claim 20 wherein providing said sensing means include providing at least one of the following sensors: open-closure sensor, motion sensor, body sensor, temperature sensor, location sensor and pulse sensor.

22. The method of claim 19 wherein
said second predetermined strength is higher than said first predetermined strength, and said second predetermined time intervals are longer than said first predetermined time intervals.

23. The method of claim 22 wherein said first signal carries the tag identification code and a weak signal code.

24. The method of claim 22 wherein said second signal carries the tag identification code, a strong signal code and data collected by sensing means associated with the tag.

25. The method of claim 19 further enabling control over accessibility to a local operating system, the monitoring system further comprising a control unit communicating with said at least one receiving unit for controlling said local operating system, the method further comprising:
receiving a signal from a transmitting tag, said signal carries the tag identification code and the signal strength identification code;
comparing the received tag identification code with a predetermined list of tag identification codes, said list include at least one tag identification code; and
denying or permitting accessibility to said local operating system in accordance with the signal strength identification code and with the comparison results obtained in the previous step.

* * * * *